Figure 1:
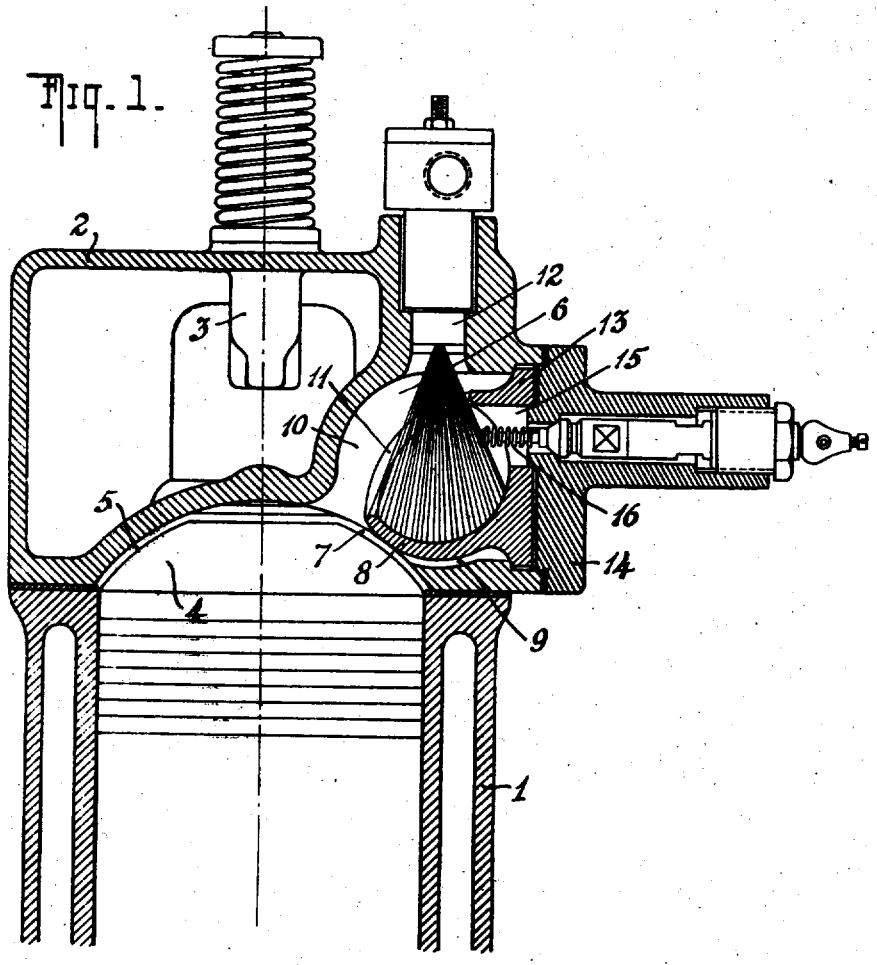

F. OBERHAENSLI

INTERNAL COMBUSTION ENGINE AND METHOD OF OPERATING THE SAME

3 Sheets-Sheet 1

Aug. 23, 1932. Original Filed Nov. 12, 1928 Re. 18,575

WITNESS
G. V. Rasmussen

INVENTOR
FRIEDRICH OBERHÄNSLI

BY
Brisen & Schlenck
ATTORNEYS

F. OBERHAENSLI

INTERNAL COMBUSTION ENGINE AND METHOD OF OPERATING THE SAME

3 Sheets-Sheet 2

Aug. 23, 1932. Original Filed Nov. 12, 1928 Re. 18,575

WITNESS
G. V. Rasmussen

INVENTOR
FRIEDRICH OBERHÄNSLI

BY
Wiesen & Hebrent
ATTORNEYS

F. OBERHAENSLI
INTERNAL COMBUSTION ENGINE AND METHOD OF OPERATING THE SAME
3 Sheets-Sheet 3
Aug. 23, 1932. Original Filed Nov. 12, 1928 Re. 18,575
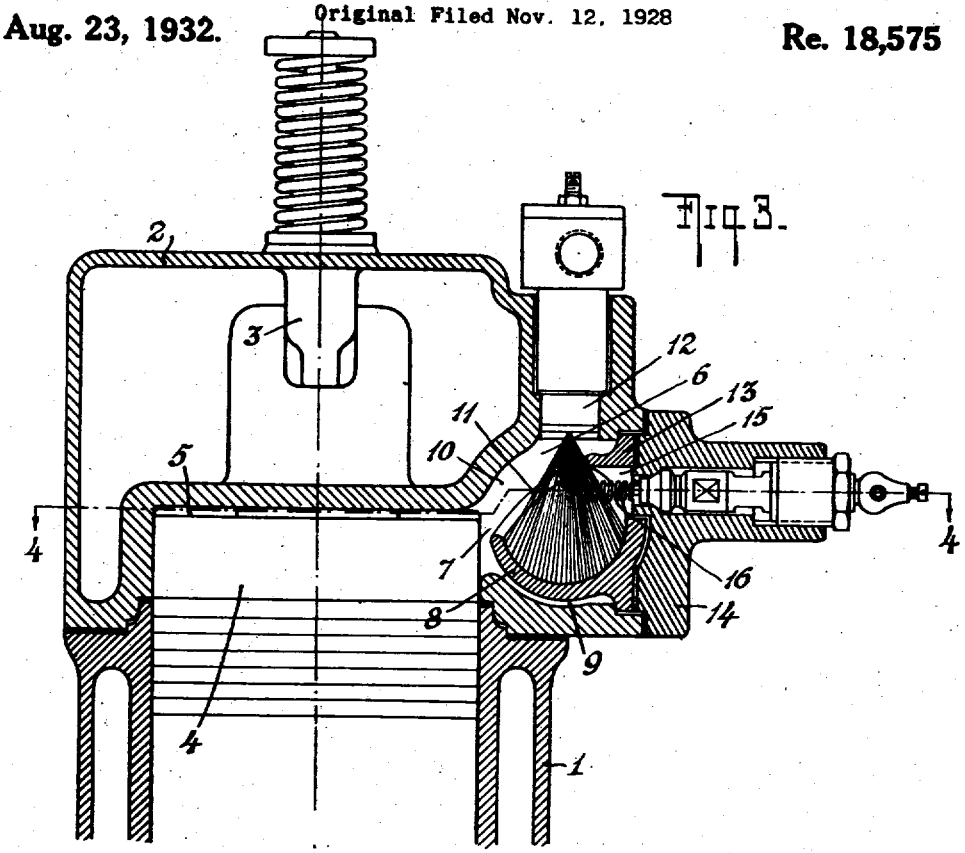
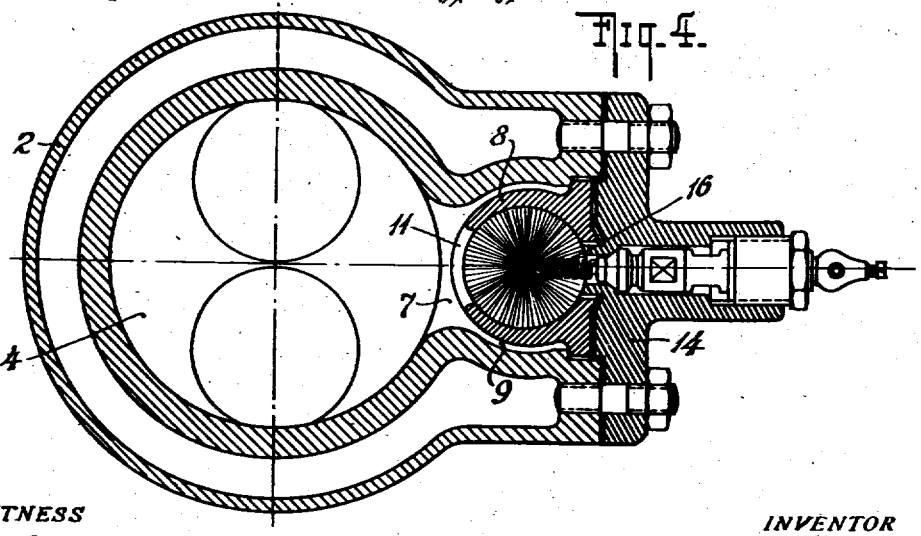
WITNESS
G. V. Rasmussen
BY
INVENTOR
FRIEDRICH OBERHÄNSLI
Briesen & Schurek
ATTORNEYS Reissued Aug. 23, 1932

Re. 18,575

UNITED STATES PATENT OFFICE

FRIEDRICH OBERHAENSLI, OF BREGENZ-LOCHAU, AUSTRIA, ASSIGNOR TO "OMO" AKTIENGESELLSCHAFT, OF ZURICH, SWITZERLAND, A CORPORATION OF SWITZERLAND

INTERNAL COMBUSTION ENGINE AND METHOD OF OPERATING THE SAME

Original No. 1,758,460, dated May 13, 1930, Serial No. 318,912, filed November 12, 1928, and in Germany December 1, 1927. Application for reissue filed February 20, 1932. Serial No. 594,344.

My invention relates to internal combustion engines and more particularly to engines adapted to employ a heavy and difficultly volatilizable fuel which is sprayed under pressure during the compression stroke into a compression space in constricted connection with the cylinder of the engine.

It is an object of the present invention to provide an engine of the above indicated character which is so constructed and operated that substantially complete vaporization of the oil and practically perfect mixing of the oil vapors with the air for supporting combustion are obtained, whereby complete combustion and consequently high efficiency result.

Internal combustion engines which employ heavy oils as fuel as now constructed may be classified either as ignition head motors or as antechamber Diesel engines. In ignition head motors, in order to provide the time necessary for vaporization and mixing, the fuel is injected upon the ignition or incandescent head during the suction stroke. High compression cannot be employed in such engines as premature ignition must be avoided. In certain types of ignition head machines in which the fuel is injected shortly before the end of the compression stroke, the compression pressure can be increased without danger of premature ignition. Such increase of compression is, however, limited because of the reduced strength of the ignition head resulting from its high heating.

In antechamber Diesel engines in which the fuel is charged into a cooled antechamber at the end of the compression stroke, the compression may be made of as high a degree as desired. The antechamber of such engines is, however, so small that only a small part of the fuel in such chamber can find the quantity of air necessary for combustion while the main portion of the fuel is burnt in the compression space of the cylinder. A partial explosion first takes place in the antechamber and the unburnt fuel is forced into the compression space of the cylinder above the piston, where it burns. Engines of this type require very high pressures in order to effect the self-ignition of the difficultly vaporizable fuel.

The improved internal combustion engine forming the subject matter of the present invention lies, with regard to the pre-ignition pressure used, between the ignition head and the antechamber Diesel engines. With a compression ratio of 1:8 to 1:10, the explosion pressures lie between 15 and 25 atmospheres. The high pressures common in Diesel engines are unnecessary as the ignition of the fuel is accomplished by means of an incandescent element. As a result of the lower pressures preferably employed by me, the mixing of fuel and air is somewhat retarded, but I overcome this difficulty by constructing the engine in such manner that the air for combustion is divided by the incandescent body into two currents having great whirling energy or turbulence. The incandescent body is constructed preferably in the form of a bell suspended in the combustion chamber, and in spaced relation thereto. This bell divides the air into two streams, one of which flows directly into the bell while the other flows along the outer surface thereof. In this way, the air streams flow over a large heated surface and are quickly heated, while the reduced space into which the streams flow causes increased velocity and turbulence, particularly just before the end of the compression stroke. The whole fuel charge is injected into at least one of these air streams just before the end of the compression stroke while the streams are still in motion, so that the turbulence of the air causes a thorough intermingling of the fuel therewith. The combustion chamber preferably communicates with the cylinder through a restricted opening or neck.

In the preferred form of the invention, the fuel charge is injected into the bell. The inlet opening for the fuel is so arranged with respect to the neck portion that only a part of the air is forced with the fuel stream directly into the interior of the incandescent body, the remaining air which ultimately enters the interior of the incandescent body being first deflected about at least a portion of the exterior surface of this body. That portion of the air which enters directly, is insufficient to support complete combustion of the fuel within the glowing element and forms with such fuel a pre-mixture of gas and air, which mixture is rendered completely combustible or rapidly ignitable only upon addition of air which has flowed around the incandescent body.

Figure 2:
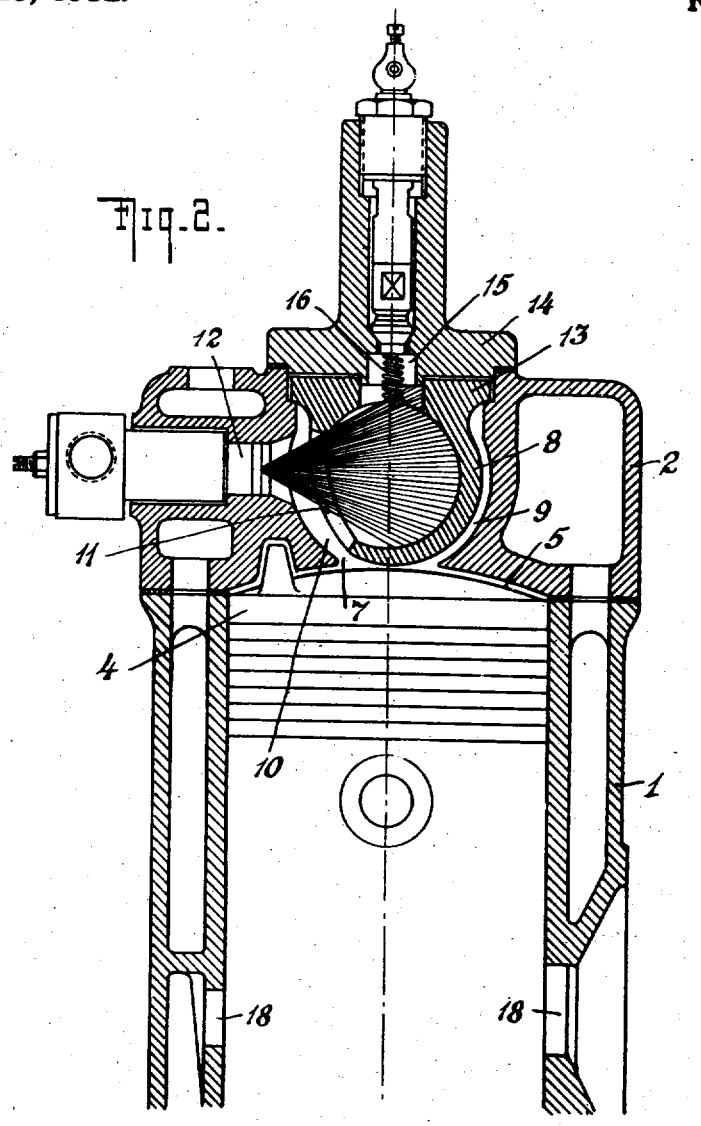

In the accompanying drawings which illustrate by way of example three types of engine having my invention embodied therein, Figs. 1 and 3 are partial longitudinal sections through four-stroke engines; Fig. 2 is a partial longitudinal section through a two-stroke engine, and Fig. 4 is a section along the line 4—4 of Fig. 3.

Fig. 1 shows a water cooled cylinder 1 provided with a similarly cooled cylinder head 2 in which are located two valves (3) for controlling the inlet of air and the exhaust of the engine, and in which is provided a combustion space 6 preferably of spherical outline. A piston 4 which is connected in well known manner to a crank shaft (not shown) fills the space 5 almost completely at its upper dead center position. As a result, the compression forces substantially all of the air into the combustion space 6. This space is preferably separated from the main cylinder space 5 by a neck or constricted passageway 7. A bell-shaped incandescent body 8, provided with an opening 11, is located within the space 6 and operates both as a vaporizer or heater for the heavy oil, as a heater for the air, and as an igniter for the fuel-air mixture. This incandescent body is suspended from one of the walls of the cylinder head, in a manner to provide intermediate spaces 9 and 10, and preferably so as to cover partially the neck or opening 7 and thus act as a deflector for the incoming air. The whole fuel charge is sprayed through the opening 11 into one of the air streams, for instance, the one which flows into the interior of the incandescent body 8 by means of a fuel nozzle 12. The body 8 is so disposed with relation to the neck 7 and to the fuel stream discharged by the nozzle 12 that the stream of air into which the fuel was injected can reach the surface of such body only by penetrating the stream of fuel. For example, the body may overlie a portion of the neck opening and thus check the direct entry of air from the cylinder into the interior of the body 8, thus forcing this air stream to pass through the fuel stream before reaching the interior of said body. The body 8 thus divides the incoming air into two streams or portions. Both of these streams spread over the surfaces of the bell 8 while in a state of turbulence and are quickly heated thereby. Fuel is injected into at least one of the streams and through the turbulence of this stream is intimately mixed with hot air.

In the preferred form, one portion of the air flows through the open neck section between the edge of the opening 11 of the incandescent body and the cylinder wall, strikes the fuel stream, penetrates the same and is projected therewith into the interior of such incandescent body, substantially without having traversed the surface of the outer wall of the incandescent body 8. This portion of the air forms with the fuel a pre-mixture of gas and air which, however, because of the low proportion of air, is not completely ignited under the conditions prevailing within the combustion space. The second portion of the air strikes the outer surface of and is deflected by the incandescent body, flows into the intermediate space 9 and thus around at least a portion of the outer surface of the incandescent body, and meets the whirling pre-mixture in the space 10 in front of the opening 11, such pre-mixture then mixing with such second stream or portion of the air to form a complete, i. e. rapidly inflammable, mixture. It is to be observed that the first portion of the air above referred to is subjected to a throttling action because of the partial closure of the neck 7 by the body 8, and as a result attains a high velocity and a violent whirling action so that as it strikes the stream of fuel it exerts a diffusive and dispersive action thereon; and that the second portion of the air as it leaves the narrow intermediate space 9 rushes with a violent whirling into the enlarged mixing space 10 filled with the pre-mixture after being heated by intimate contact with the outer surface of the incandescent body. It is to be observed, however, that while the space 9 is narrow in cross-section, it presents a relatively large cross-sectional area of admission to the incoming air due to the fact that it is coextensive with the exposed outer surface of the incandescent body. This second stream or portion of air, which has been heated and somewhat delayed in its deflected course about at least a portion of the outer surface of the glowing element, serves to form a rapidly inflammable mixture with the pre-mixture of the first mentioned stream of air and the fuel.

The incandescent body 8 is loosely supported from the side of the cylinder head by means of a flange 13 and is so held by a cover flange 14 that it can expand freely as it becomes heated. Upon removal of the flange 13 the body 8 can be easily removed.

The flange 13 has an opening 15 which is adapted to receive an incandescent spiral 16 or similar priming apparatus, which may be heated to incandescence by any suitable means, for igniting the mixture upon starting of the engine. This apparatus is shown as carried by the cover flange. As soon as the engine becomes warm the mixture of fuel and air is ignited by the incandescent body 8 and the auxiliary igniting apparatus may then be cut out.

In the two-stroke engine illustrated in Fig. 2, the inlet and outlet openings 18 for the air and exhaust respectively are positioned in the cylinder 1 itself. Because of this construction the combustion space 6 together with the vaporizer and incandescent body 8 may be arranged along the axis of the cylinder. The fuel stream in this type of engine is directed perpendicularly to such axis. In other respects the construction of this engine is similar to that illustrated in Fig. 1.

Fig. 3 illustrates another engine, having my invention applied thereto, in a manner similar to that shown in Fig. 1, but having a flat top piston, instead of the round top piston illustrated in Figs 1 and 2. Fig. 4, while a cross-section only of Fig. 3, serves to illustrate the construction of Fig. 1 and 2 of which therefore no cross-sectional views are shown.

The method of forming the explosive mixture in accordance with my invention makes it possible to utilize, even at compression rations under 1:10, heavy oils such as have otherwise been capable of use only in Diesel engines, and to produce intimate admixture thereof with air. The explosion pressures in my improved engine may be far below the maximum pressures of Diesel engines and may approximate the pressures common in ordinary gas engines. The consumption of fuel is not appreciably higher than that of Diesel engines.

As the gas-fuel mixture produced by my invention is an intimate one, my improved engine may operate at the high speeds which are common in ordinary gas engines. My engine can therefore be run as a high speed motor and is thus adapted for the driving of automobiles and aeroplanes. Very high efficiency is obtained with my improved engine because the combustion is complete and no unburnt fuel is carried off by the exhaust. A further important feature of my invention is that the body 8, which acts both as a vaporizer and an igniter, remains completely clean and does not become coated with a layer of carbon. Because of the fact that the fuel is not directed upon the piston and into the cylinder, the latter do not become covered with unburnt residual matter.

The spherical form of the combustion space 6 and of the incandescent body has a favorable and important influence upon the production of whirling within the air streams and thus upon the completion of the mixture of air and fuel. It will be obvious, however, that the incandescent body 8 may assume other forms than the spherical and it is to be understood that where in the claims I employ the term "bell-shaped body" the same is to be construed generically as including all suitable forms of hollow bodies having an opening to receive a stream of air and capable of being so positioned within the combustion space that an intermediate space is provided between such body and the walls of the cylinder head.

It is not necessary to the practice of the invention that the streams should form a pre-mixture in the bell to which is added the air flowing around the bell. Good results can be obtained in any arrangement in which the air is divided into two streams which flow one into and the other around the bell, with injection of fuel into at least one of these streams during the compression stroke.

My invention may be employed with equal advantage in vertical and in horizontal engines. Other variations from the specific forms shown and described may be resorted to within the scope of the appended claims without departing from the spirit of my invention.

I claim:

1. A heavy oil motor comprising a cylinder, a piston slidable therein, an air inlet valve, a hollow member associated with said cylinder and defining a compression space into which a charge of air is adapted to be forced and compressed during the compression stroke of the piston, said space communicating with the interior of said cylinder through a constricted passageway, a bell-shaped body provided with an opening and positioned within said member at least partially in spaced relation thereto, whereby an intermediate space between said body and said member is formed, and a fuel nozzle arranged to spray a stream of fuel into the interior of said body through the opening thereof, said body being adapted to become incandescent during the operation of the motor to vaporize and ignite said fuel, and being so disposed with respect to said passageway as to divide the current of air into two streams such that part of the current of air enters directly with said fuel into said body and part is deflected into the intermediate space about said body, whereby a pre-mixture of air and fuel comprising a mixture slow to ignite is first formed in said body, said pre-mixture becoming rapidly inflammable on mixing with the air streaming around said body through said intermediate space.

2. A heavy oil motor as set forth in claim 1, wherein said bell-shaped body is so positioned as partially to cover said passageway, whereby the portion of the air entering with the fuel into the interior of said body attains a high velocity and is set into violent whirling.

3. A heavy oil motor as set forth in claim 1, wherein said fuel nozzle and said bell-shaped body are so disposed with respect to each other that the portion of the air flowing through said passageway and into said body must penetrate the stream of fuel directed by said nozzle into the opening of said body.

4. A heavy oil motor as set forth in claim 1, wherein said bell-shaped body at approximately its open end is spaced farther from the walls of said hollow member than is the opposite portion thereof, whereby an enlarged mixing space is provided into which the air streaming through said intermediate space rushes with violent whirling motion to form the final combustible mixture with the pre-mixture.

5. A heavy oil motor as set forth in claim 1, wherein the interior walls of said hollow member and said incandescent body are substantially spherical in form.

6. A heavy oil motor as set forth in claim 1, wherein said fuel nozzle is so disposed with relation to said passageway as to direct the stream of fuel at an angle to the direction of flow of the air through said passageway, whereby said first part of the air impinges upon and penetrates said fuel stream prior to its entry into said body.

7. A heavy oil motor comprising a cylinder, a piston slidable therein, an air inlet valve, a hollow member associated with said cylinder and defining a compression space into which a charge of air is adapted to be forced and compressed during the compression stroke of the piston, said space communicating with the interior of said cylinder through a constricted passageway, a fuel nozzle arranged to spray a stream of fuel into said space, and a deflector partially obstructing said passageway and arranged to divide the air flowing through said passageway into two streams, one of said streams being directed toward the fuel stream at a substantial angle thereto to form a pre-mixture therewith, said deflector being positioned to initially deflect the second air stream away from said fuel stream during the formation of the pre-mixture and being of such shape as ultimately to direct such second air stream into said pre-mixture, whereby a final combustible mixture is formed.

8. The method of operating an internal combustion engine having an incandescent ignition element within its combustion space and to which separate charges of air and fuel are fed, which comprises first mixing said fuel within said combustion space during the compression stroke with a portion of the air charge to form a pre-mixture therewith, and then heating the remaining air while guiding it in a flowing stream and conducting to such mixture such flowing streams of the remaining air to form the final explosive charge, toward the end of the compression stroke.

9. The method of operating an internal combustion engine having an incandescent ignition element within its combustion space, which comprises spraying a charge of fuel into such space during the compression stroke of the piston while simultaneously compressing a charge of air toward said space, dividing such air into two portions, one of said portions being directed toward said space to mix with said fuel to form a pre-mixture therewith, and heating and directing the remaining air by a separate path in a flowing stream toward said mixture to form a rapidly inflammable mixture therewith.

10. The method of operating an internal combustion engine having an incandescent ignition element in its combustion space, and such space in constricted connection with the cylinder of the engine, which comprises spraying a stream of liquid fuel against said incandescent element to be vaporized thereby, compressing a charge of air during the compression stroke of said piston and directing the resulting stream of air in such manner that a portion thereof impinges against said fuel stream at a substantial angle thereto, whereby said portion of the air is carried along with said fuel and forms a pre-mixture with the fuel vapors, and heating and imparting a whirling motion to the remainder of the charge of air and directing the same by a different path toward said pre-mixture to form a final rapidly inflammable mixture therewith.

11. The method of operating an internal combustion engine having a hollow incandescent ignition element within its combustion space and to which separate charges of air and fuel are fed, which comprises feeding air into said combustion space and dividing said air into two streams one of which flows to the inside of said incandescent element while the other flows around the outside thereof, and injecting fuel at a point outside said ignition element into one of said streams near but before the end of the compression stroke, whereby said fuel enters said stream while it is still in motion and is mixed therewith by the turbulence thereof, said streams and any fuel mixed therewith being supplied with heat and the fuel-air mixture being ignited by said incandescent element.

12. The method of operating an internal combustion engine having a hollow incandescent ignition element within its combustion space and to which separate charges of air and fuel are fed, which comprises feeding air into the cylinder of the engine, compressing said air by the piston into said combustion space and dividing said air flowing into said combustion space into two streams one of which flows to the inside of said incandescent element while the other flows around the outside thereof, and injecting fuel into one of said streams at a substantial angle thereto near but before the end of the compression stroke, whereby said fuel enters said stream while it is still in motion and is mixed therewith by the turbulence thereof, said streams and any fuel mixed therewith being supplied with heat and the fuel-air mixture being ignited by said incandescent element.

13. The method of operating an internal combustion engine having an incandescent element of large surface area within its combustion space and to which separate charges of air and fuel are fed, which comprises dividing the air charged into said combustion space into a plurality of turbulent streams which contact with the surfaces of the incandescent element and receive heat therefrom, and injecting fuel into one of said streams at a point outside said ignition element near but before the end of the compression stroke while said stream is still in a state of turbulence whereby said fuel is intimately mixed with the air of said stream, said incandescent element igniting said fuel-air mixture.

14. The method of operating an internal combustion engine to which separate charges of air and fuel are fed, which consists in dividing the charge of air into two streams as it flows into the combustion chamber, thereby producing turbulence in such streams, introducing fuel into both of said streams by injecting fuel into at least one of said streams at a substantial angle thereto while said streams are in motion, and then igniting said fuel when the air of both streams contains at least a part of said fuel.

15. A heavy oil motor comprising a cylinder, a piston slidable therein, an air inlet valve, a hollow member associated with said cylinder and defining a compression space into which a charge of air is adapted to be forced and compressed during the compression stroke of the piston, a bell-shaped body provided with an opening and positioned within said member at least partially in spaced relation thereto, whereby an intermediate space between said body and said member is formed and whereby the air current is divided into two streams one of which flows into the interior of said body through the opening thereof while the other flows into the space around said body, means located outside of said body operated near but before the end of the compression stroke to spray a stream of fuel into one of said air streams, said body becoming incandescent during the operation of the motor to ignite the formed fuel-air mixture, both said air streams and any fuel mixed therewith being supplied with heat by said body, said air stream receiving said fuel while in motion and by turbulence causing an intimate mixture between the fuel and air.

16. A heavy oil motor comprising a cylinder, a piston slidable therein, an air inlet valve, a hollow member associated with said cylinder and defining a compression space into which a charge of air is adapted to be forced and compressed during the compression stroke of the piston, said space communicating with the interior of said cylinder through a constricted passageway, a bell-shaped body provided with an opening and positioned within said member at least partially in spaced relation thereto, whereby an intermediate space between said body and said member is formed and whereby the air current is divided into two streams one of which flows into the interior of said body through the opening thereof while the other flows into the space around said body, means operated near but before the end of the compression stroke to spray a stream of fuel into one of said air streams at a substantial angle thereto, said body becoming incandescent during the operation of the motor to ignite the formed fuel-air mixture, both said air streams and any fuel mixed therewith being supplied with heat by said body, said air stream receiving said fuel while in motion and by turbulence causing an intimate mixture between the fuel and air.

17. A heavy oil motor as set forth in claim 16, wherein the interior walls of said hollow member and said incandescent body are substantially spherical in form.

18. A heavy oil motor comprising a cylinder, a piston slidable therein, an air inlet valve, a hollow member associated with said cylinder and defining a compression space into which a charge of air is adapted to be forced and compressed during the compression stroke of the piston, said space communicating with the interior of said cylinder through a passageway, a bell-shaped body provided with a single opening only and positioned within said member at least partially in spaced relation thereto, whereby an intermediate space between said body and said member is formed, said body being so disposed with respect to said passageway as to divide the air current into two streams such that one of the streams flows into the interior of said body through the opening thereof while the other stream flows through the space around said body and then through said opening into said body, means operated near but before the end of the compression stroke to spray a stream of fuel into one of said air streams, said body becoming incandescent during the operation of the motor to ignite the formed fuel-air mixture, both said air streams and any fuel mixed therewith being supplied with heat by said body, said air stream receiving said fuel while in motion and by turbulence causing an intimate mixture between the fuel and air.

19. A heavy oil motor comprising a cylinder, a piston slidable therein, an air inlet valve, a hollow member associated with said cylinder and defining a compression space into which a charge of air is adapted to be forced and compressed during the compression stroke of the piston, a bell-shaped body provided with a single opening only and positioned within said member at least partially in spaced relation thereto, whereby an intermediate space between said body and said member is formed and whereby the air current is divided into two streams one of which flows into the interior of said body through the opening thereof while the other flows into the space around said body, means operated near but before the end of the compression stroke to spray a stream of fuel into one of said air streams, said body becoming incandescent during the operation of the motor to ignite the formed fuel-air mixture, both said air streams and any fuel mixed therewith being supplied with heat by said body, said air stream receiving said fuel while in motion and by turbulence causing an intimate mixture between the fuel and air.

In testimony whereof, I have hereunto set my signature.

FRIEDRICH OBERHAENSLI.